United States Patent
Gloge

[11] 3,785,718
[45] Jan. 15, 1974

[54] LOW DISPERSION OPTICAL FIBER
[75] Inventor: Detlef Christoph Gloge, Red Bank, N.J.
[73] Assignee: Bell Telephone Laboratories, Incorporated, Murray Hill, N.J.
[22] Filed: Sept. 11, 1972
[21] Appl. No.: 288,033

[52] U.S. Cl............................ 350/96 WG, 350/96 R
[51] Int. Cl. ................................................ G02b 5/14
[58] Field of Search ............................. 350/96 WG

[56] References Cited
UNITED STATES PATENTS
3,434,774  3/1969  Miller............................ 350/96 WG
3,350,654  10/1967  Snitzer....................... 350/96 WG UX
3,646,473  2/1972  Young....................... 350/96 WG X OTHER PUBLICATIONS
Kawakami et al. "Propagation Loss in a Distributed Beam Waveguide" Proceedings of the IEEE, December, 1965, pp. 2148–2149.

Primary Examiner—John K. Corbin
Attorney—S. Sherman

[57] ABSTRACT

The faster propagating, higher order modes are selectively removed from a multimode optical fiber by either attenuating said modes or by coupling the modes out of the fiber core and into the surrounding cladding. In one embodiment the fiber core is surrounded by a low-loss cladding of prescribed thickness, and a refractive index that is no greater than that of any portion of the core. In an alternate embodiment, the core is surrounded by a low-loss cladding whose refractive index is greater than that at the periphery of the core.

7 Claims, 8 Drawing Figures

PATENTED JAN 15 1974  3,785,718
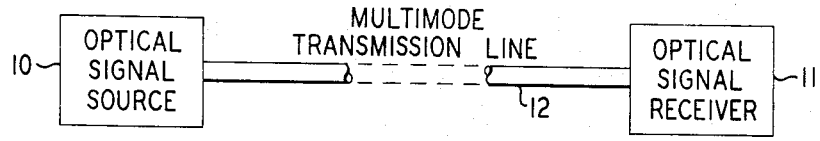
FIG. 1
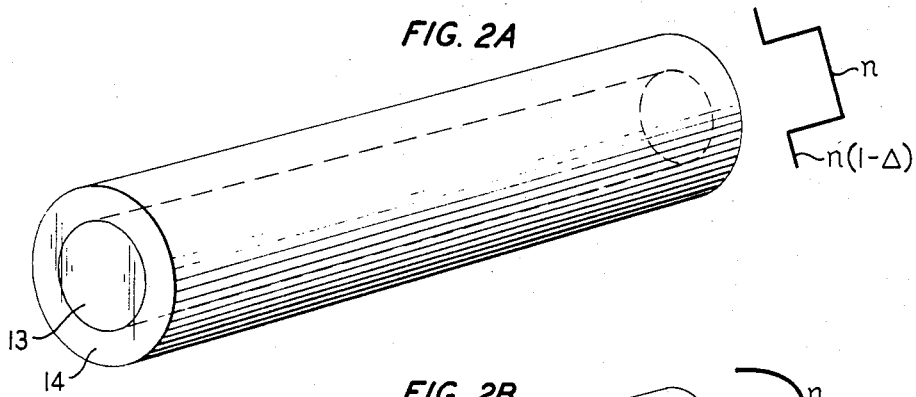
FIG. 2A
FIG. 2B
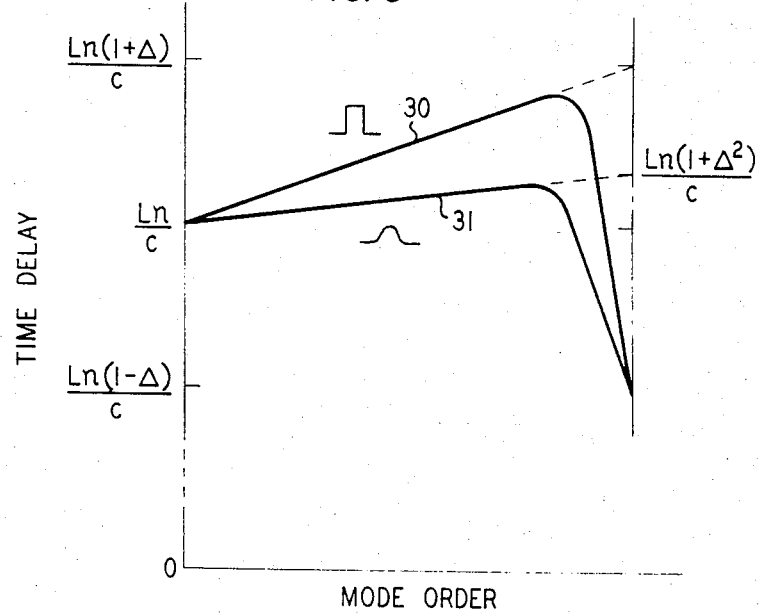
FIG. 3

LOW DISPERSION OPTICAL FIBER

This invention relates to multimode optical fibers having reduced delay distortion.

BACKGROUND OF THE INVENTION

Multimode optical fibers have certain advantages over single-mode fibers with respect to light injection and splicing tolerances. However, because the various modes propagate with different group velocites, there is considerable signal distortion produced in a multimode fiber.

It is, accordingly, the object of the present invention to reduce the delay distortion in a multimode fiber.

SUMMARY OF THE INVENTION

There are basically two types of optical fibers. One type comprises a core material of uniform refractive index surrounded by a cladding of lower refractive index. The other type is the graded index fiber comprising a material wherein the refractive index tapers from a maximum value at the center, to a minimum value at the outer surface. When made sufficiently large, both types of fibers are capable of guiding optical wave energy in a variety of modes, each of which propagates at a particular group velocity.

Typically, the group velocity initially decreases as the mode order increases. However, a point is reached beyond which this tendency reverses, and the group velocity starts to increase very rapidly with a further increase in mode order. For the graded index fiber, the initial change in velocity is relatively small. However, the variation becomes significant for the fast, higher order modes.

In accordance with the present invention, the faster propagating, higher order modes are removed either by absorption in a lossy jacket, or by being coupled out of the fiber core. In a first specific embodiment, the graded index core is surrounded by a lossy jacket which attenuates those higher order modes that have fields of significant intensity at the outer edge of the core. In a more selective arrangement, in accordance with a second embodiment of the invention, the graded index core and the lossy jacket are separated by a low-loss cladding which has a uniform refractive index that is no greater than that of any portion of the core, and a prescribed thickness. By the inclusion of the cladding, the number of modes that are attenuated can be controlled. While this second embodiment is more efficient than the first, it has the disadvantage of requiring a cladding whose thickness must be held within prescribed limits. This requirement is avoided, in accordance with a third embodiment of the invention, by using a low-loss cladding material whose refractive index is greater than the minimum core index. In this arrangement, the modes to be discarded are coupled out of the core region of the fiber and, advantageously, dissipated by means of a surrounding lossy jacket. The number of modes so affected is determined by the height of the index barrier formed by the cladding.

These and other objects and advantages, the nature of the present invention, and its various features, will appear more fully upon consideration of the various illustrative embodiments now to be described in detail in connection with the accompanying drawings.

BRIEF DESCRIPTION OF THE DRAWINGS

FIG. 1 shows, in block diagram, a multimode, optical communication system to which the present invention relates;

FIGS. 2A and 2B show two optical fibers for use in the communication system of FIG. 1;

FIG. 3 shows the variations in the delay as a function of mode order for a graded index core fiber and a constant index core fiber.

DETAILED DESCRIPTION

Figure 4:
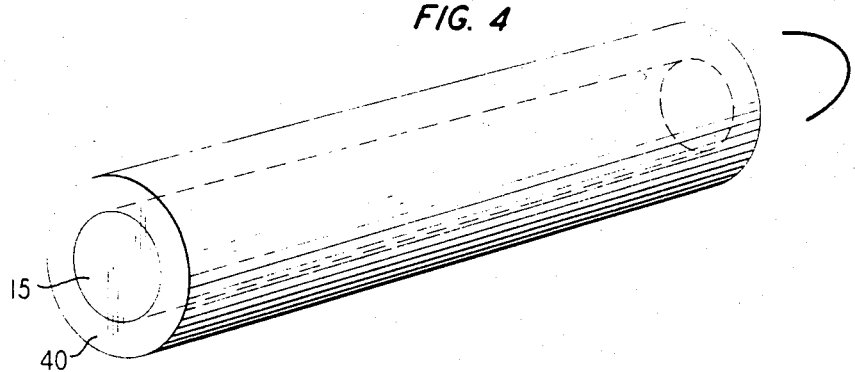
FIGS. 4, 5, 6 and 7 illustrate four different embodiments of the present invention and the refractive index profiles of each of the embodiments.

Referring to the drawings, FIG. 1 shows, in block diagram, on optical communication system comprising an optical signal source 10, an optical signal receiver 11, and a multimode optical fiber transmission line 12 connecting the source to the receiver.

The present invention relates to the transmission line portion of the system and, in particular, to means for reducing the delay distortion produced in the multimode optical fiber. One embodiment of such a fiber, as illustrated in FIG. 2A, comprises an inner core 13 of uniform refractive index $n$, surrounded by an outer cladding 14 of lower refractive index $n(1-\Delta)$, where $\Delta$ is a small positive number.

FIG. 2B shows a second embodiment of a fiber comprising a graded index core region surrounded by air. In this fiber the refractive index decreases continuously from a maximum of $n$ at the center of the core to a minimum of $n'$ at its outer periphery. While the index can vary in any arbitrary manner, in a particularly advantageous embodiment the index decreases as a function of the square of the distance from the center of the core.

Of the variety of modes capable of propagating along such fibers, the lowest order mode has a delay close to that of a plane wave propagating in the core center. If the refractive index in the center is $n$, the time for wave energy, propagating in the lowest order mode, to traverse a length of fiber $L$, (i.e., the delay) is $$t = Ln/c \quad (1)$$

where $c$ is the vacuum velocity of light.

The delay then increases with the mode order up to those higher order modes whose fields extend significantly into the cladding, or, in the case of the graded index core, into the surrounding air. For these higher order modes, the delay decreases and eventually drops to the value expected for a plane wave propagating in the cladding. If the refractive index of the cladding is $n(1-\Delta)$, where $\Delta$ is a small positive number, the plane wave delay in the cladding is $$t' = [Ln(1-\Delta)/C] \quad (2)$$

The rate at which the delay increases with mode order depends upon the index profile of the core, as shown by curves 30 and 31 in FIG. 3. If the core index is uniform, as in FIG. 2A, the delay varies in the manner represented by curve 30, increasing from the initial value given by equation (1), reaching a maximum for one of the higher order modes, and then decreasing to a minimum given by equation (2).

A rate of increase that is smaller by the factor $\Delta$ is obtained using the graded index core illustrated in FIG.

2B. If, for example, $\Delta = 2$ percent, the delay would increase at a much smaller rate, as given by curve 31, such that the contribution of the lower order modes to the signal distortion would be only one-fiftieth of that of a uniform core. There remains, however, in both cases, the delay distortion introduced by the fast, higher order modes. If these fast modes are eliminated, the dispersion characteristic of both types of fibers would be improved. In particular, the delay distortion in the graded index core fiber would be improved very considerably. There is a slight penalty to be paid in powr loss, however, but this can be made very small as the unwanted modes constitute only a small fraction of the total power.

Figure 5:
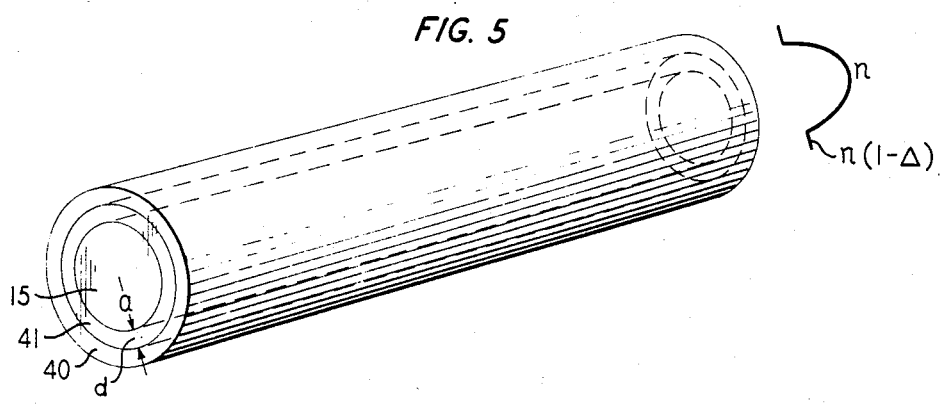

The easiest way of eliminating the undesired, higher order modes is simply to surround the fiber with a lossy jacket, as illustrated in FIG. 4. In this configuration, the graded index core 15, of the type shown in FIG. 2B, is surrounded by a lossy jacket 40. Thus, any mode having a significant field at the periphery of the core is highly attenuated by the lossy jacket. This would, of course, eliminate the fast, higher order modes. However, it would also eliminate many of the other modes as well and, hence, is not a preferred configuration. Advantageously, some means for controlling the number of modes affected should be provided. Such an arrangement is illustrated in FIG. 5, which shows a low-loss cladding of thickness $d$, and uniform refractive index $n(1-\Delta)$, interposed between the graded indx core 15 and the lossy jacket 40. In this embodiment, the thickness of the cladding provides a means for controlling to what extent the various modes are attenuated. For example, the field in the cladding of the $m^{th}$ mode, out of a total of $M$ modes, decreases as $$e_m(x) = \exp[-2nk(\Delta\ M-m/M)^{1/2}x] \quad (3)$$

where $x$ is the distance from the core-cladding interface; and $k = 2\pi/\lambda$ is the vacuum wave number.

The resulting attenuation for that mode is approximately $$\alpha_m = \sqrt{(2\Delta/a)}\ e_m(d)\ . \quad (4)$$

where $a$ is the core radius.

Because of the exponential dependence of $e_m$ on $m^{1/2}$, the loss increases sharply with $m$, so that modes of higher order than $m$ have significantly higher losses, whereas modes of lower order are hardly affected by the jacket. Thus, if we chose $\alpha_m = 100$ dB/km, where $m$ is the lowest unwanted mode, the total fraction, $f = M-m/M$, of unwanted modes is strongly attenuated. For example, for $a = 50\ \mu m$, $f = 10$ percent, and $\Delta = 0.02$, at $\lambda = 1\ \mu m$, we obtain $d = 15\ \mu m$ for $\alpha_m = 100$ dB/km.

As a practical matter, however, it is not desirable to be required to control the cladding thickness very closely. A preferred arrangement, in accordance with the present invention, is to control the refractive index profile of the fiber. Whereas the refractive index of the cladding in the typical prior art fiber is equal to or less than that of the core periphery, in a fiber in accordance with the third embodiment of the present invention, the cladding index has a value that is greater than that of the immediately adjacent core region. In this latter arrangement, the cladding can have any, unspecified thickness so long as it is greater than the thickness specified hereinabove for the given minimum attenuation.

Figure 6:
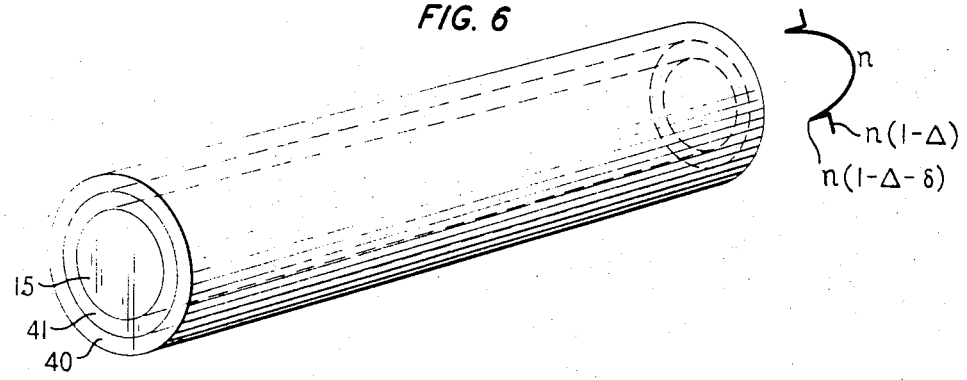

The above-described embodiment of the invention is illustrated in FIG. 6 for a fiber whose core 15 has a graded index which decreases from a maximum value $n$ at the center of the core, to a minimum value $n' = n(1-\Delta-\delta)$ at its outer periphery. The core is surrounded by a cladding 41 having a refractive index $n(1-\Delta)$ which is greater than the core minimum by an amount $n\delta$. While not necessary in this embodiment, an outer lossy jacket 40, advantageously, surrounds the cladding.

In the conventional fiber, the medium surrounding the core has a refractive index that is equal to or less than that at the periphery of the core. By contrast, in the embodiment of FIG. 6, the cladding has a value that falls between the maximum index at the center of the core, and the minimum index at the outer periphery of the core. The presence of this higher index cladding is sensed by the higher order modes which tunnel through the index barrier and into the cladding. Unlike the previous embodiments, wherein the higher order modes are bound to the core and have fields which extend beyond the core, in the instant embodiment these modes are coupled out of the core and become cladding modes. As such, they are no longer part of the useful signal. Advantageously, means, such as lossy jacket 40, are provided to dissipate these cladding modes.

The relative barrier height to couple modes above the $m^{th}$ mode is given in terms of the mode order as $$\delta = \tfrac{1}{2}\ (M-m/M)\Delta = f\Delta/2 \quad (5)$$

The embodiment represented by FIG. 6 can be readily fabricated by surrounding the graded index core preform with a cladding whose index is greater than the peripheral index $n(1-\Delta-\delta)$ of the core by an amount $n\delta$. The fiber is then pulled in the usual way to form the index barrier illustrated. It is an advantage of this latter embodiment that the undesired modes are eliminated by controlling the refractive index of the cladding, which is more easily done than by controlling the cladding thickness. In fact, in this case, the cladding thickness is not at all critical so long as it is greater than about 20 $\mu m$. A typical cladding thickness would be between 20–40 $\mu m$.

Figure 7:
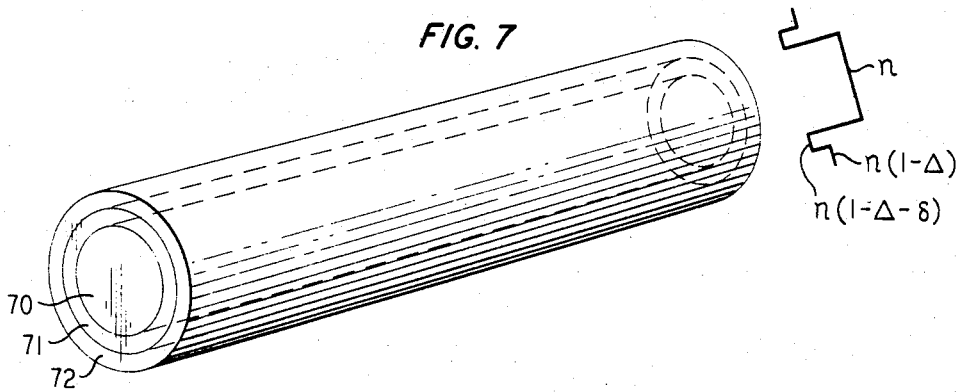

While the benefits to be derived are not as great, a similar technique can be used with a constant index core fiber, as illustrated in FIG. 7, wherein a constant core region 70 is surrounded by a low-loss intermediate region 71 of refractive index $n(1-\Delta-\delta)$ and a cladding 72 of refractive index $n(1-\Delta)$. An outer, lossy jacket (not shown) is advantageously also included. The jacket in this and in each of the other embodiments, can be either a separate lossy material or, alternatively, the cladding surface can be roughened so as to scatter the optical wave energy incident thereon. Thus, in all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. An optical fiber comprising:

an inner core material having a graded refractive index which varies continuously from a maximum value at its center to a minimum value at its outer surface;

a low-loss cladding of constant refractive index equal to said minimum value surrounding said core;

said cladding having a thickness $d$ expressed in terms of the mode numbers and specified attenuation as $\alpha_m = \sqrt{(2\Delta/a)}\, e_m(d)$ ;

where $e_m(d) = \exp[-2nk(\Delta M - m/M)^{1/2} d]$, and is proportional to the field at the outer surface of the cladding for the $m^{th}$ mode out of a total of $M$ modes;

$n$ is the refractive index at the core center;

$a$ is the core radius;

$n(1-\Delta)$ is the refractive index of the cladding; and $k = 2\pi/\lambda$ is the vacuum wave number of the optical wave energy;

and lossy means surrounding said cladding.

2. An optical fiber comprising:

an inner core of low-loss material having a uniform refractive index $n$;

an intermediate region surrounding said core comprising a low-loss material having a uniform refractive index $n(1-\Delta-\delta)$ less than $n$, where $\Delta$ and $\delta$ are positive numbers;

said core and said intermediate region being proportioned to support wave energy in a plurality of propagating modes;

and an outer cladding surrounding said intermediate region comprising a low-loss material having a refractive index $n(1-\Delta)$.

3. The optical fiber according to claim 2 including a lossy outer jacket for attenuating wave energy coupled into said cladding.

4. The optical fiber according to claim 2 wherein $\delta$ and $\Delta$ are related by $$\delta = 1/2\ (M-m/M)\,\Delta,$$

where $m$ is the $m$th mode out of a total of $M$ propagating modes.

5. An optical fiber comprising:

a core of low-loss material whose refractive index varies radially from a maximum value $n$ at its center to a minimum value $n(1-\Delta-\delta)$ at its outer surface, where $\Delta$ and $\delta$ are positive numbers;

said core being supportive of wave energy in a plurality of propagating modes;

and an outer cladding surrounding said core comprising a low-loss material having a refractive index $n(1-\Delta)$.

6. The optical fiber according to claim 5 including a lossy out jacket for attenuating wave energy coupled into said cladding.

7. The optical fiber according to claim 5 where $\delta$ and $\Delta$ are related by $$\delta = 1/2\ (M-m/M\ \Delta),$$

where $m$ is the $m$th mode out of a total of $M$ propagating modes.

* * * * *